June 4, 1974    SHOJI OKA ET AL    3,814,781
METHOD OF MAKING FOOTWEAR HAVING A POLYURETHANE SOLE
Original Filed Sept. 16, 1968    3 Sheets-Sheet 1

INVENTORS
SHOJI OKA
TAKASHI WAKABAYASHI

BY *Sughrue, Rothwell, Mion, Zinn & Macpeak*
ATTORNEYS 3,814,781
METHOD OF MAKING FOOTWEAR HAVING A POLYURETHANE SOLE
Shoji Oka and Takashi Wakabayashi, Osaka, Japan, assignors to The Toyo Rubber Industry Co., Ltd., Osaka, Japan
Continuation of application Ser. No. 767,899, Sept. 16, 1968, which is a continuation-in-part of application Ser. No. 594,581, Nov. 15, 1966, both now abandoned. This application Apr. 19, 1972, Ser. No. 245,620
Int. Cl. B29h 7/08
U.S. Cl. 264—54     9 Claims

ABSTRACT OF THE DISCLOSURE

Method for producing footwear having a polyurethane sole of desired specific gravity which comprises casting a liquid, polyurethane-forming material into a shoe sole mould maintained at a definite initial temperature, mounting a last which bears a shoe upper on the shoe sole mould, allowing the polyurethane-forming material to foam and adhere to the bottom of the upper, and then removing the mould and last from the product and curing the foamed shoe sole.

---

This is a continuation, of application Ser. No. 767,899, filed Sept. 16, 1968, now abandoned, which in turn is a continuation-in-part of Ser. No. 594,581, Nov. 15, 1966, now abandoned.

BACKGROUND OF THE INVENTION

Field of the invention

This invention relates to a method of making footwear having a polyurethane foam sole.

Description of the prior art

In prior methods of making shoes, a shoe upper, formed by cementing or sewing together several parts or elements together with a cemented inner sole member, is mounted on a last. Cement is then applied to the bottom of the shoe upper and dried. A rubber tape is wound on and rolled to the bottom of the shoe upper. Then a sole member cemented to the shoe upper and the assembly thus built up, if desired, after treatment with a milled roller, is hung on a carrier and vulcanized in a vulcanizing pan using steam or hot air. Thus, the prior methods consist of many stages and need a number of workers to complete the operation. It has been proposed to make shoes with a synthetic resinous sole by injecting under high pressure a hot melt of a thermoplastic resin such as, e.g., vinyl, polyamide or polyester resins, into a shoe sole-forming mould to form a synthetic resinous shoe sole adherent or firmly bonded to a shoe upper, and taking out the finished shoe from the mould after cooling and solidification of the resin. This method, however, has shortcomings in that (1) there is need, in carrying out this method, for employing a high-priced injection machine and a precisely fabricated metal mould, (2) the shoe upper member is apt to be broken up since it is strained by being forcibly pressed against the mould, (3) it is very difficult to prevent leakage of resin because of the high pressure imposed on the resin, (4) the method itself is inefficient due to the necessity of heating the mould to a high temperature and cooling it for ease of withdrawal of the finished product therefrom, (5) it is difficult to obtain uniform adhesion between the resinous sole and shoe upper, and (6) the upper member must be made out of a thermally resistant and tenacious material.

In contrast, since the material to be employed in the method of this invention is a liquid of a low viscosity it can be poured or introduced into the mould by means of, e.g., a gear pump or plunger pump without any difficulty. In addition, in the method of this invention, it is unnecessary for the mould to be formed of a material of high strength and to be so precisely fabricated, since in the moulding process the mould faces an elastomeric material under the mere expanding pressure of the foam. Furthermore, by the choice of the initial mould temperature, the shoe sole to be formed can be varied from a soft sponge-like one to a rigid solid-like one.

SUMMARY OF THE INVENTION

It has been found that footwear having a polyurethane sole with controllable density may be formed by a simple process which comprises introducing a liquid, polyurethane foam-forming material into a shoe sole-forming mould having a recess in the form of a shoe sole, the shoe sole mould being maintained at a definite temperature to control the density of the final foamed sole. A last, which carries a shoe upper is mounted upon the shoe sole mould, and the polyurethane-forming material is allowed to foam, whereby it will become adherent to the bottom of the upper. The shoe sole mould and last are removed from the product and the product is generally allowed to cure. Adhesion of the upper to the foamed sole is due solely to the expansion of the foam.

Shaped inserts may be incorporated into the sole during the moulding process, and, if desired, a releasable film may be used to insure separation from the mould.

It is thus an object of the present invention to provide a method of making footwear in which a liquid, polyurethane foam-forming material introducted into a shoe sole-forming mould having a recess of the shape of a shoe sole in which adhesion of the shoe sole to the upper is effected only by the expanding pressure of the foam.

It is a further object to provide a foamed shoe sole process in which the density of the foam can be altered by varying the initial temperature of the shoe sole-forming mould.

It is an additional object to provide a process for forming a foamed coherent shoe sole with shaped "inserts" of rubber, synthetic resin or metal in the surface of the shoe sole.

DESCRIPTION OF THE PREFERRED EMBODIMENTS

The object of the present invention is to provide footwear and a method of making it in which in liquid, polyurethane foam-forming material is poured or introduced into a shoe sole-forming mould having a recess of the shape of a shoe sole. Adhesion of the sole thus formed of polyurethane foam to the upper, carried by a last, is effected only by the expanding pressure of the foam. The density of the foam can be altered by varying the initial temperature of the shoe sole-forming mould.

In a modification of the method of the present invention, to the whole or a portion of the moulding surface of the shoe sole-forming mould there are fitted shaped bodies of rubber, synthetic resin or metal. To the space between the mould and a last bearing a shoe upper there is introduced a defined quantity of a liquid, polyurethane-forming material. The polyurethane-forming material is then allowed to foam to fill up the space and form a coherent body with the shaped bodies to form a shoe sole adherent to the bottom of the shoe upper.

In another modification of the method of the present invention, in the manufacture of footwear with a polyurethane sponge sole by pouring a liquid, polyurethane-forming composition into a shoe sole-forming mould having a recess of the shape of a shoe sole, a mold releasing film of synthetic resinous material capable of being easily separated from the polyurethane sponge sole thus formed is applied to the moulding surface of the shoe sole-forming mould prior to pouring of the liquid, polyurethane-forming composition.

In still another modification, the shoe sole-forming mould is made out of a synthetic resin which will be easily separable from the polyurethane sponge to be formed therein.

Figure 1:
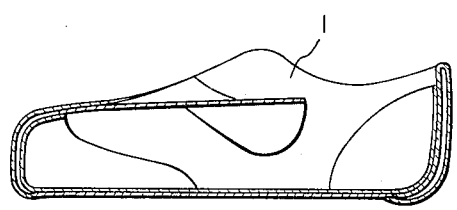
FIG. 1 is a longitudinal cross-sectional view of an assembly of a shoe upper and a sole mounted on a last.
Figure 2:
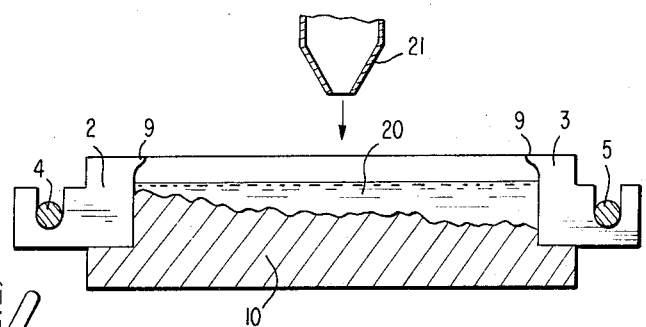
FIG. 2 is a cross-sectional view shown the pouring of a liquid polyurethane-forming mixture into a shoe sole-forming mould.
Figure 3:
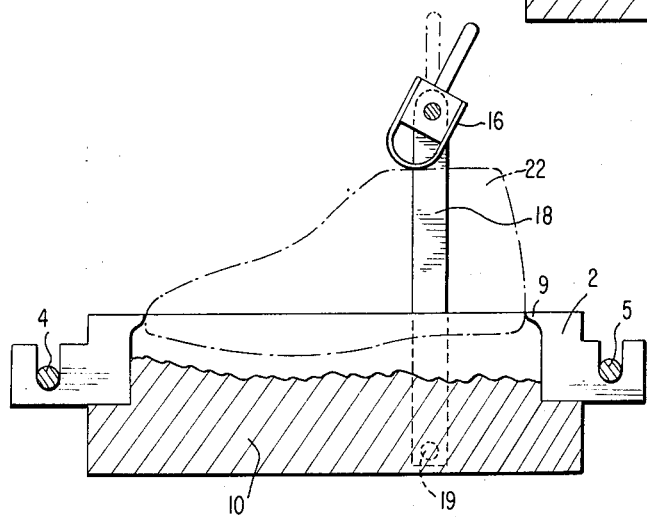
FIG. 3 is a cross-sectional view showing the assembly of the shoe sole-forming mould and last.
Figure 4:
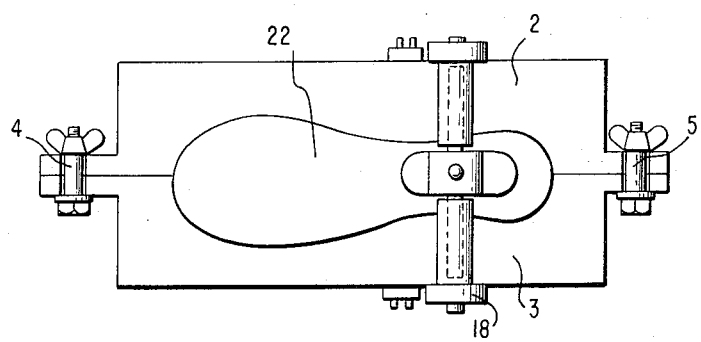
FIG. 4 is a plane view of an assembly of the sole-forming mould and last.
Figure 6:
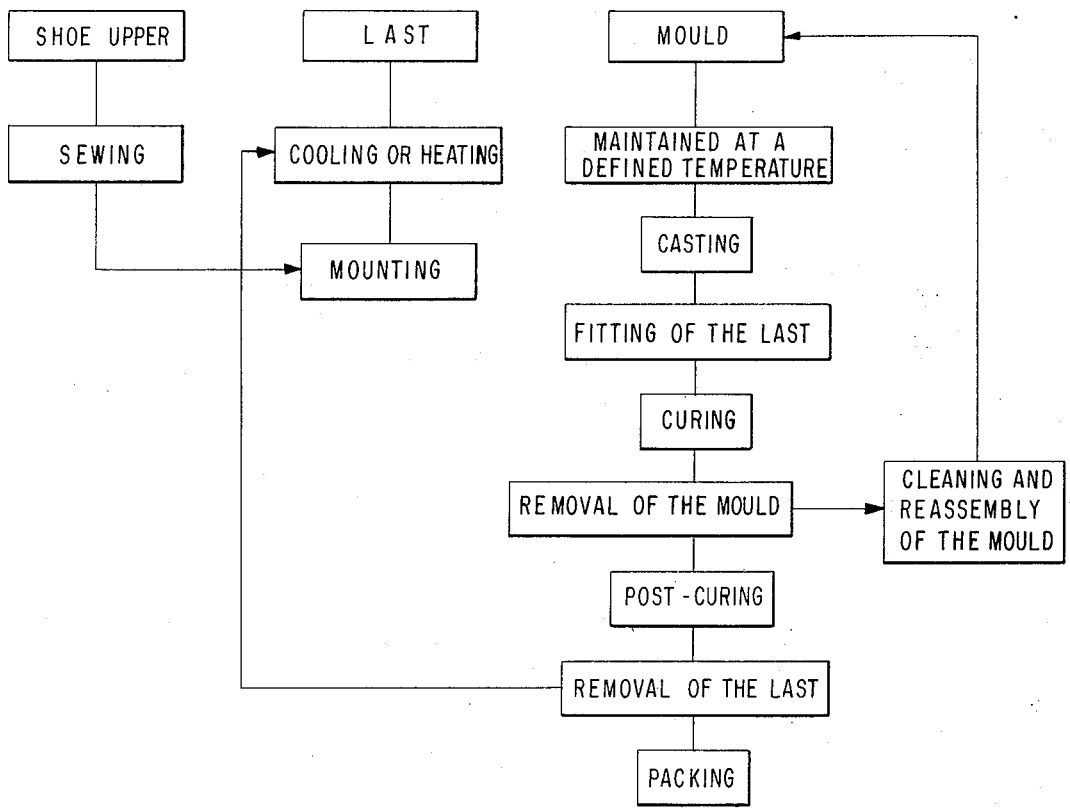
FIG. 6 is a flow-sheet diagrammatically illustrating an embodiment of the method of this invention.

In still another modification, the shoe sole-forming the flow-sheet of FIG. 6, there may be used as shoe upper material, either alone or in combination, leather, textile fabrics, vinyls, artificial leathers, papers or like sheet materials. The shoe upper 1 sewn up as shown in FIG. 1, is combined with a bottom member by sewing into a bag and the bag is put on a last 22. Alternatively, the shoe upper may be mounted on a last with an inner sole member and, optionally, a core member as in usual practice. The shoe sole mould is composed of a bottom 10 and side walls 2, 3 and may be of split type or non-split type. The shoe sole mould is maintained at a definite temperature within a range from a low temperature to the elevated, curing temperature of the foam to be formed corresponding to the desired physical properties of the foam. Then into the shoe sole mould maintained at the definite temperature there is introduced a liquid, polyurethane-forming mixture through a nozzle 21. Although the liquid, polyurethane-forming mixture cast into the mould forms a water level within a short period of time owing to its low viscosity even if poured through a fixed nozzle, the nozzle may be moved during pouring or the shoe sole mould may be moved. There may also be employed a plurality of nozzles for pouring of the liquid mixture. The feed rate of the liquid mixture may be the same or different at every nozzle. One may choose any of these systems according to the type of sort of the footwear to be manufactured and/or to the working conditions. In cases of employing a plurality of nozzles, one or more of the nozzles may be fed with a different liquid, polyurethane-forming mixture to form a foam with locally different densities. This may also be attained by locally varying the temperature of the mould.

In an embodiment of the present invention which comprises (1) putting or forming on the whole or portion of the moulding surface of the shoe sole mould shaped bodies of rubber, synthetic resin or metal, (2) pouring or casting a liquid, polyurethane-forming mixture into the space between the shoe sole mould and a last bearing a shoe upper, (3) allowing the liquid mixture to foam to fill up the space and become adherent to the bottom of the shoe upper and to the shaped bodies to form a shoe sole, the problem of wearing down of the shoe sole is at least partly solved by using abrasion resistant shaped bodies in a manner such that they will locate in positions in the shoe sole at which the shoe sole undergoes violent abrasive actions, and by use of non-skid metals as the shaped bodies shoe soles with non-skid metal are obtainable. Thus, shoe soles of various characteristics may be easily prepared by using various shaped bodies as inserts. In the case of using shaped bodies of poor adhesion to the polyurethane form, the shaped bodies should be pretreated with a material, e.g., a urethane-based cement, neoprene-isocyanate cement, neoprene-phenolic resin cement or epoxy cement to improve adhesion. After casting a liquid, polyurethane-forming mixture into the recess of the shoe sole mould in an appropriate procedure, as set forth above, a last on which a shoe upper has been mounted is put on and lightly pressed to the shoe sole moulds for a period of time. During this period, the liquid mixture foams and fills up the space between the last and shoe sole mould and the curing of the liquid mixture proceeds. Although, in this case, the liquid, polyurethane-forming mixture is poured into the mould prior to fitting of the last to the mould, the liquid mixture may be introduced into the space between the mould and last through an inlet formed in the bottom or side wall of the mould, after fitting of the last to the mould by inserting the nozzle in the tapered inlet hole or through-hole in the mould. Also, in the latter case, there may be employed a plurality of feed nozzles.

Prior to the introduction of the liquid, polyurethane-forming mixture, the temperature of the shoe sole mould is adjusted to and maintained at a temperature between 10° C. and 90° C., most preferably 20° C. and 80° C. Then a defined quantity of the liquid mixture is introduced into the mould and the last on which a shoe upper has been mounted is put on the mould. The whole is then maintained at the temperature for about 10 minutes to perform the primary curing of the liquid mixture to such an extent that the liquid mixture becomes a solid capable of being taken out of the mould. Then the shoe sole thus formed is taken out of the mould together with the last which bears the shoe upper and is allowed to stand at room temperature or in a heating chamber until it is properly cured. Thereafter, the last is removed from the finished product. Though it is preferable to conduct the curing in two stages for the sake of the turnover rate of the mould, it may be conducted in one stage. In the latter case, there may be employed a shoe sole mould provided with electric heating means. On occasions, the curing may be conducted by maintaining the mould at a temperature below 20° C., or above 80° C.

In this method of manufacture, the density of the polyurethane foam is defined by the temperature of the shoe sole mould before introduction of the liquid, polyurethane-forming mixture, so that the initial temperature of the mould should be chosen and maintained during the primary curing at the temperature depending on the desired properties. When the liquid, polyurethane-forming mixture (2) is introduced into the shoe sole mould while maintaining the mould at room temperature or lower temperature, there is obtained a foamed shoe sole with high rigidity, is suitable for use as a shoe sole and is a foam having a strong skin layer. The lower the temperature of the shoe sole mould, the higher is the rigidity of the resulting foam, since expansion of the foam is restrained, so that there is obtained a foam of low water and soil absorbing properties. The interior portion of such foams is of a lower density. Accordingly, it is preferred to obtain foams of such quality. The data below illustrates the relationship between the initial temperature of the forming mould and the average density of the final shoe sole:

| Initial mould temperatures, °C.: | Average density of final shoe sole |
|---|---|
| 10 | Ca. 0.7 |
| 20 | Ca. 0.6 |
| 30 | Ca. 0.5 |
| 60–80 | Ca. 0.4 |
| 90 | Ca. 0.3 |

On the contrary, when the shoe sole mould is maintained at a high temperature during introduction of the liquid, polyurethane-forming mixture, there is obtained a foam of a uniform density throughout the interior and exterior thereof. Therefore, it is possible to make shoe soles of light weight. However, the shoe sole thus formed has the defects of absorbing water and soil to some extent. Therefore, it is most preferred to heat the liquid, polyurethane-forming mixture 20 to a temperature as high as possible just before introduction into the mould and to maintain the shoe sole mould at a low temperature so as to obtain a foam having a high density surface portion and a low-density inner portion. However, the curing time required is prolonged to some extent in this manner. Thus, as mentioned above, the rigidity of the foam depends upon the temperature of the shoe sole mould and, therefore, a foam of desired properties can be obtained by an appropriate choice of the mould temperature just before introduction of the liquid, polyurethane-forming mixture thereinto.

As illustrated in the Figures of the drawing, the shoe sole mould consists of a bottom member 10 and a pair of side wall members 2, 3 fastened together by means of, e.g., bolts and nuts 4, 5 so as to clamp the bottom member. The last is lightly pressed against the shoe sole mould by means of a lever or screw-type pressure member 16 mounted to frames 18, fixed to the bottom member 10 by pins 19. In some instances, the pressure member may be replaced by a weight. To a portion of the peripheral surface of the last opposite the interior peripheral edge 9 of the side wall of the shoe sole mould there may be applied a rubber tape or tape of a rubber-like elastomeric material as to prevent damage of the shoe upper and to prevent leakage of the liquid, polyurethane-forming mixture 20. In order to obtain the same effect, a rib formed of rubber or rubber-like elastomeric material of various rigidities may be fixed by means of pins and bolts to the interior peripheral edge of the side wall 2, 3 in place of the protrusion 9 on the interior peripheral edge.

Figure 5:
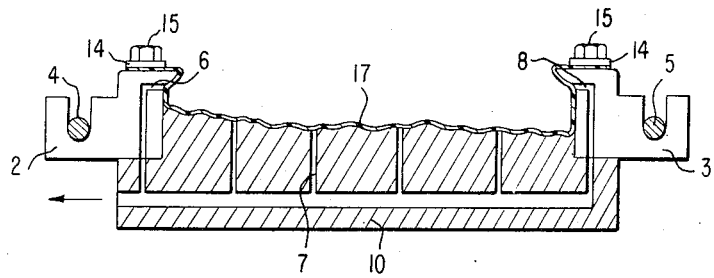
FIG. 5 is a longitudinal cross-sectional view showing a mould releasing film on the moulding surface of a shoe sole-forming mould.

A mould releasing film may be applied to the inside surface of the shoe sole mould. In this modification, a seamless film or sheet of polyethylene, polypropylene, polystyrene or like synthetic resinous material that is easily separable from the polyurethane foam is applied to the recess of the shoe sole mould by a vacuum forming process or other film forming process. To the recess thus covered with a mould releasing film or sheet there is cast a liquid, polyurethane-forming mixture 20 which will foam into a polyurethane foam sole adherent to a shoe upper in the recess. For instance, as illustrated in FIG. 5, a shoe sole mould consisting of a bottom member 10 and a pair of side wall members 2, 3 is built up and clamped by bolts 4, 5. The bottom and side wall members have suction holes 6, 7, 8 and the joints of the members are sealed with O-rings or like rubber packings. A film or sheet 17 of synthetic resinous material is put on the side wall members 2, 3 as to cover the cavity of the shoe sole mould and is air-tightly clamped by means of frame 14 and clamping bolts 15. Then the synthetic resin film or sheet is uniformly heated by means of an infrared heater located above the film or sheet and the cavity of the shoe sole mould is evacuated through the suction holes 6, 7, 8 to form a mould releasing film in conformity with the recess or cavity of the shoe sole mould. On the mould releasing film there is cast the liquid, polyurethane-forming mixture. However, in order to increase the production rate, it is preferred to form the mould releasing film separately using a film-forming mould having the same contour with the shoe sole mould and to put the so previously formed film into the shoe sole mould just before introduction of the liquid, polyurethane-forming mixture. This process where a mould releasing film is employed is economical since, in this process, leakage of the liquid polyurethane-forming mixture through the joints of the bottom and side wall members of the shoe sole mould is prevented, so that a constant and appropriate amount of the liquid mixture is retained in the mould, a product of a uniform density is obtained, occurrence of failures is avoided and the finishing of the products to eliminate flushes therefrom is unnecessary. Moreover, though it is necessary, when the mould releasing film is not employed, to retain the cast liquid, polyurethane-forming mixture within the mould for at least about 10 minutes in order to avoid failure upon withdrawal from the mould even if a mould releasing agent or mould lubricant is applied to the mould surface, the last can be withdrawn from the mould after retention of only about 5 minutes without any failure of the shoe sole thus moulded using the mould releasing film.

Alternately, products of good quality may be obtained without using any mould releasing agent or mould lubricant by employing a shoe sole mould formed of polyethylene, polypropylene, polystyrene or like synthetic resinous material, which is separable from polyurethane foams with no difficulty, casting a liquid, polyurethane-forming mixture, in the manner mentioned above, into the mould, and allowing the liquid mixture to foam and directly adhere to the shoe upper.

Figure 7:
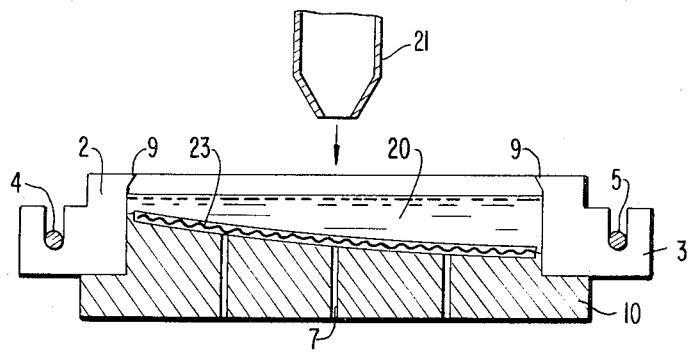
FIG. 7 is a longitudinal cross-sectional view of an assembly showing the incorporation of a urethane-rubber plate insert into a sole formed on a sole-forming mould.
Figure 8:
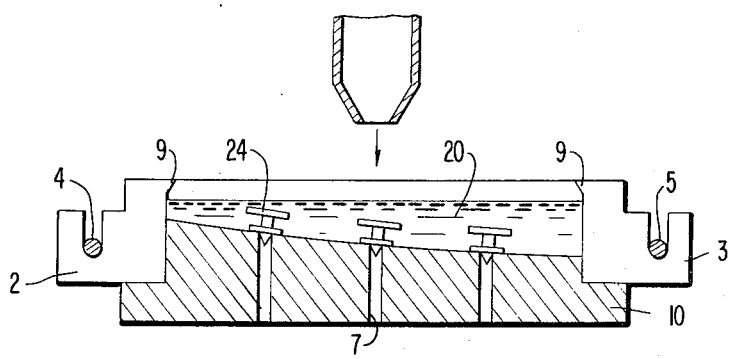
FIG. 8 is a longitudinal cross-sectional view of an assembly showing the incorporation of a spike-type insert into a sole forming on a sole-forming mould.

FIGS. 7 and 8 illustrate the incorporation of inserts into the foamed shoe sole of the present invention. In both figures, 7 represents a suction hole which holds the inserts tightly against the bottom 10 of the mould while the polyurethane-forming mixture 2 is being foamed.

Specifically, in FIG. 7, after a colored urethane-rubber plate 23 was put into the mould, the liquid urethane was poured into the mould. The urethane-rubber plate 23 has a solidity of about 50–60° (JIS), and due to the foaming pressure the plate is pressed against the lower part of the mould. In this case, as the air is forced out from beneath the plate via suction hole 7, the urethane-rubber plate easily conforms to the surface of the mould. Of course, the suction holes 7 can be replaced by mere venting holes, since the foam pressure will suffice to press the plate against the mould.

When using an ordinary rubber plate, usually some suitable adhesive agent is applied or a cotton cloth is attached to the face which contacts the foaming sole per se.

FIG. 8 is similar to FIG. 7, but shows the use of a "spike-type" insert 24 which may be metal, rubber or the like.

EXAMPLE 1

1 mole of a poly(epsilon-caprolactone) diol of a molecular weight of 1,000 and 2 moles of tolylene diisocyanate were reacted at 80° C., for 2 hours to form an isocyanate-terminated pre-polymer of a free isocyanate content of 6%. 100 parts of the pre-polymer maintained at 70° C., 17 parts of 4,4-methylene-bis (2-chloroaniline) at 110° C., 0.2 part of tin octoate at room temperature, 2 parts of a silicone at room temperature and 0.14 part of water at room temperature were quickly mixed together and the resutling mixture was cast or poured into a shoe sole mould maintained at 80° C. A last which bore a shoe upper was then fitted to the shoe sole mould and the whole was allowed to stand. After about 10 minutes, the mixture could be withdrawn from the mould adhered to the last and upper. After sufficiently curing the sole, the last was taken out. The foam thus formed exhibited a specific gravity of 0.40, a 100% modulus of 15 kg./sq. cm., a tensile strength at break of 30 kg./sq. cm. and an elongation at break of 360%.

EXAMPLE 2

1 mole of a poly(oxytetramethylene)glycol was reacted with 2 moles of tolylene diisocyanate at 80° C., for 2 hours to form an isocyanate-terminted pre-polymer of a free NCO content of 6%. 100 parts of the pre-polymer thus formed with quickly mixed together with 17 parts of 4,4-methylene-bis(2-chloroaniline), 2.2 parts of dibutyltin dilaurate, 1.5 parts of a silicone and 0.14 parts of water and the mixture was poured into a shoe sole mould maintained at 80° C. Then a last which bore a shoe upper was fitted to the mould and the whole was allowed to stand still. After 30 minutes, both the last and shoe sole mould could be with drawn or removed from the product. The foam thus obtained exhibited similar properties as in Example 1.

EXAMPLE 3

1 mole of a poly(oxytetramethylene)glycol of a molecular weight of 1,000 was reacted with 2.5 moles of diphenylmethane diisocyanate at 80° C., for 2 hours to form an isocyanate-terminated pre-polymer of a free NCO content of 7%. 100 parts of the pre-polymer thus formed was quickly mixed together with 4.5 parts of ethylene glycol, 1 part of a silicone, 0.25 part of tetramethylbutane diamine and 0.1 part of water and the mixture was cast or poured into a shoe sole mould maintained at 20° C. Then a last which bore a shoe upper was fitted to the mould and the assembly was allowed to stand for about 10 minutes. The mould was then removed and, after completion of curing, the last was removed. The foam thus obtained exhibited a specific gravity of 0.6, a 100% modulus of 20 kg./sq. cm., a tensile at break of 87 kg./sq. cm. and an elongation at break of 390%.

EXAMPLE 4

Using a polyester in place of the polyether as in Example 3 in preparation of the pre-polymer, a similar result was obtained.

EXAMPLE 5

100 parts of a poly(epsilon-caprolactone)glycol maintained at 50° C., was quickly mixed together with 71 parts of diphenylmethane diisocyanate (40° C.), 9 parts of ethylene glycol (room temperature), 1.5 parts of a silicone (at room temperature), 0.17 part of water (at room temperature) and 0.01 parts of dibutyltin dilaurate (at room temperature) and the mixture was cast or poured into a shoe sole mould at 20° C. Then a last which bore a shoe upper was fitted to the mould. The whole was then allowed to stand for about 10 minutes and the mould was removed. After completion of curing, the last also was removed. The foam thus obtained exhibited properties similar to the product of Example 3.

What is claimed is:
1. In a method for making footwear having a sole formed of a polyurethane foam comprising:
  (1) mounting a last which bears a shoe upper thereon on a shoe sole mould, the last bearing said upper being forcibly held against the shoe sole mold to define an initial space therein between said mould and said upper;
  (2) casting a quantity of a low viscosity, liquid, polyurethane foam-forming mixture into said initial space wherein said foam-forming mixture is substantially at its foaming temperature;
  (3) foaming said foam-forming mixture to form a foamed sole; and
  (4) removing the mold and the last from the foamed sole and curing the foamed sole; the improvement comprising regulating the specific gravity or bulk density of said sole by maintaining said initial space constant during molding, maintaining said mold at an initial temperature of from 10 to 90° C., a higher temperature providing a foam of relatively lower density and likewise, a lower temperature providing foam of relatively higher density, and allowing the foam-forming mixture in the mold to foam and fill up said constant initial space whereby adhesion of the resulting foamed sole to the shoe upper is due solely to the pressure exerted by the expanding foam against said shoe upper carried by the last and held against said mold, thereby forming a single piece unitary sole.

2. The method of claim 1 wherein the mould is maintained at an initial temperature of from 20 to 80° C.

3. The method as defined in claim 1 further comprising placing on the bottom moulding surface of the shoe sole mould at least one shaped body to which said sole is adhered concurrently with adherence of said sole to said upper.

4. The method as defined in claim 1 further comprising fitting the recess of the shoe sole mould with a releasing film which is easily separable from the polyurethane foam.

5. The method of claim 4 wherein said releasing film is vacuum fitted to said shoe sole mould.

6. The method of claim 5 wherein said releasing film comprises a synthetic resin selected from the group consisting of polyethylene, polypropylene and polystyrene.

7. The method as defined in claim 1 further comprising forming said shoe sole mould from a synthetic resin which is easily separable from the polyurethane foam.

8. The method of claim 7 wherein said synthetic resin is selected from the group consisting of polyethylene, polypropylene and polystyrene.

9. The method of claim 1 further comprising maintaining the temperature of the mould at a temperature no greater than room temperature so that the foamed sole has a dense skin layer and a less dense core.

References Cited
UNITED STATES PATENTS

| | | | |
|---|---|---|---|
| 3,018,517 | 1/1962 | Ludwig | 264—54 |
| 3,099,516 | 7/1963 | Hendrickson | 264—54 |
| 3,124,627 | 3/1964 | Hood | 264—54 |
| 3,187,069 | 6/1965 | Pincus et al. | 264—45 |
| 3,341,646 | 9/1967 | Britain | 264—213 |
| 3,345,664 | 10/1967 | Ludwig | 264—45 |
| 3,390,213 | 6/1968 | Rollman et al. | 264—45 |

DONALD E. CZAJA, Primary Examiner
R. W. GRIFFIN, Assistant Examiner

U.S. Cl. X.R.
264—45, 244, 338